United States Patent [19]
Wyatt et al.

[11] 3,879,361
[45] Apr. 22, 1975

[54] POLYMERISATION PROCESS

[75] Inventors: Ronald John Wyatt, Runcorn; Edward McKillop Nicholl, Stockton-on-Tees, both of England

[73] Assignee: Imperial Chemical Industries Limited, London, England

[22] Filed: Nov. 10, 1972

[21] Appl. No.: 305,331

[30] Foreign Application Priority Data
Nov. 22, 1971 United Kingdom............. 54119/71

[52] U.S. Cl. .......................... 260/80.78; 252/431 R
[51] Int. Cl. .......................... C08f 1/56; C08f 1/30
[58] Field of Search ................................. 260/80.78

[56] References Cited
UNITED STATES PATENTS
3,326,883  6/1967  Kelley et al. ....................... 260/949
3,681,306  8/1972  Wehner ........................... 260/80.78

FOREIGN PATENTS OR APPLICATIONS
2,040,353  2/1971  Germany
951,022  3/1964  United Kingdom OTHER PUBLICATIONS
Gaylord and Mark, "Linear and Stereo Regular Addition Polymers" (Wiley, 1959), pp. 120–121.

*Primary Examiner*—Joseph L. Schofer
*Assistant Examiner*—A. L. Clingman
*Attorney, Agent, or Firm*—Cushman, Darby & Cushman

[57] ABSTRACT

A continuous process for copolymerising ethylene and an alpha-olefine optionally together with a non-conjugated diene comprises continuously introducing the monomers to a polymerisation zone containing liquid alpha-olefine and a catalyst which is the product of reacting a transition metal complex with an inert matrix material having a hydroxylic surface and continuously removing a slurry of copolymer particles in liquid alpha-olefine and continuously recycling the latter after separation of the copolymer.

12 Claims, 1 Drawing Figure

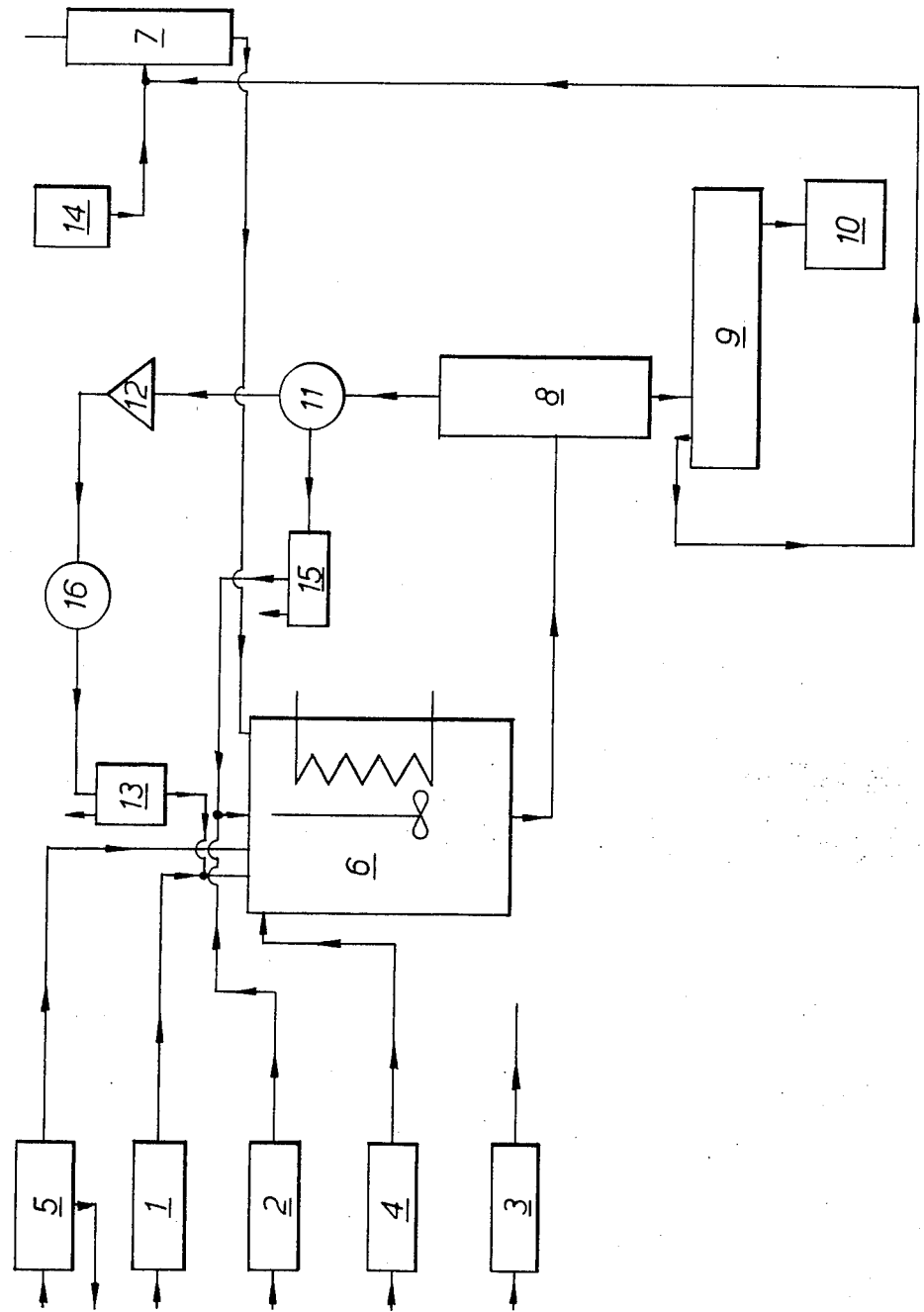

POLYMERISATION PROCESS

The present invention relates to the production of polymers, in particular to the production of copolymers of ethylene and an alpha-olefine having from three to 10 carbon atoms, optionally together with a non-conjugated diene.

According to the invention a process for the production of co-polymers of ethylene and an alpha-olefine containing from three to 10 carbon atoms, optionally together with a non-conjugated diene comprises:

a. continuously introducing to a polymerisation zone a catalyst slurry as hereinafter defined and ethylene, a liquid alpha-olefine containing from three to 10 carbon atoms and optionally a non-conjugated diene, b. continuously reacting the ethylene alpha-olefine and optional diene in the liquid alpha-olefine so as to produce a slurry of copolymer particles suspended in the alpha-olefine, c. continuously removing from said zone said slurry of copolymer particles suspended in liquid alpha-olefine containing any unreacted ethylene, and optional diene, and d. continuously separating the copolymer particles and recycling alpha-olefine and any ethylene, and optional diene to said polymerisation zone.

The alpha-olefine having from three to 10 carbon atoms is preferably propylene. In the remainder of this specification the process of the invention is discussed with reference to propylene but this should be taken as being equally applicable to other alpha-olefines having from three to 10 carbon atoms.

Preferably hydrogen is also introduced to the polymerisation zone as a means of controlling the molecular weight of the copolymer product. Unreacted hydrogen may be removed in stage ($c$), separated from the polymer in stage ($d$) and recycled.

The catalyst slurry which is introduced to the polymerisation zone is a suspension of a solid catalyst selected from those described and claimed in our co-pending British Patent Application No. 40416/69, 40417/69 (equivalent to German OLS No. 2,040,353) suspended in a liquid hydrocarbon such as liquid propane. This liquid hydrocarbon which is chosen so as to be substantially inert in the subsequent polymerisation only forms a small percentage, e.g. 1 to 5% w/w of the hydrocarbons in the polymerisation zone. It does not therefore function as solvent or diluent in the zone, in which the liquid suspending agent is the alpha-olefine, e.g. liquid propylene. The catalysts claimed in our co-pending application are the product of reacting a transition metal complex of the general formula $R_mMX_p$ with a substantially inert matrix material having a hydroxylic surface which is free from adsorbed water. In the formula, M is a transition metal of Groups IVA to VIA of the Periodic Table, preferably titanium, vanadium or zirconium; R is a hydrocarbon group or substituted hydrocarbon group; X is a monovalent ligand such as a halogen and $m$ and $p$ are integers, $m$ having a value of from 2 to the highest valency of the metal M, and $p$ having a value of from 0, to 2 less than the valency of the metal M, except when M is a metal of Group VIA when $p$ is always 0. Suitable hydrocarbon groups R include alkyl and alkenyl groups, preferably containing up to 20 carbon atoms, especially alkyl and alkenyl groups containing up to six carbon atoms, such as neopentyl $\pi$-allyl and $\pi$-methallyl groups and in particular substituted alkyl groups of general formula —$CH_2Y$, sigma-bonded to the transition metal through the carbon atom as indicated. In the formula, Y is an atom or group capable of interaction with the vacant d-orbitals of the metal M, e.g. an aromatic group such as phenyl, tolyl or xylyl, a polyaromatic group such as naphthyl or a cycloalkenyl group such as cyclo-octenyl. Y may also comprise a group of general formula $Z(R')_3$ where Z represents silicon, germanium, tin or lead and R' represents a hydrocarbon group or hydrogen, but is preferably an alkyl group particularly a $C_1$ to $C_6$ alkyl group. Examples of this preferred class of complexes include zirconium and titanium tetrabenzyl, tris(benzyl) zirconium chloride, zirconium tetrakis (p-methyl benzyl), zirconium and titanium tetrakis (1-methylene-1-naphthyl) and zirconium tetrakis (trimethylsilylmethylene).

By "hydroxylic surface" is meant a plurality of —OH groups attached to the surface of the matrix material, the hydrogen atom of the —OH group being capable of acting as a proton source. Such a material will be substantially inert in that, whereas the —OH groups are capable of reacting with the transition metal hydrocarbyl complex the bulk of the matrix material is chemically inert. Preferred examples of such surfaces are those provided by alumina or silica or mixtures thereof. The matrix material must be free from adsorbed water and this may be achieved by heating the material, preferably to a temperature in the range 150° to 1,000°C.

The catalyst is preferably finely particulate, e.g. particle size in the range 10 – 200, more preferably 50 – 200 microns and is preferably stored under an inert hydrocarbon such as n-hexane or toluene in an atmosphere free from oxygen, e.g. of nitrogen or argon, i.e., under conditions such that it is kept free from catalyst poisons such as water, oxygen, carbon dioxide, carbon monoxide, acetylenes etc.

The ethylene and propylene and the optional non-conjugated diene should be free from water, oxygen and similar catalyst poisons before use in the process andd this may be achieved if necessary by contacting them with suitable adsorbents and chemical treating agents, e.g. alumina, molecular sieve driers and commercially available de-oxygenation agents such as copper supported on alumina. The ethylene is suitably stored as a liquid at a temperature of −40° to 0°C and pressure of 14 – 60 ats. Similarly the propylene is preferably stored and fed to the process as a liquid, e.g. at a temperature of +30°C to −30°C or less, and pressure of 2 to 30 ats. Hydrogen may be fed to the process as a gas and has the function of providing a control of the molecular weight of the polymer. Only a small amount, e.g. 0.01 to 1.0%, preferably 0.1 to 0.2% v/v of the contents of the polymerisation zone of hydrogen is required for this purpose and excess hydrogen is preferably recycled, ingress of fresh hydrogen being controlled so as to preserve the desired concentration in the polymerisation zone.

The non-conjugated diene which may be used in the process may be chosen from one of the following groups:

a. Acyclic diolefines in which the double bonds are separated by more than two carbon atoms and in which at least one double bond is terminally located, e.g. 1,4-hexadiene and 1,6-octadiene, b. Monocyclic dienes or alkyl substituted monocyclic dienes in which both double bonds are located in the ring and which preferably contain six to 12 carbon atoms, e.g. cyclo-octadiene, c. Alkenyl cycloalkenes preferably containing up to 12 carbon atoms, e.g. 4-vinyl cyclohexene, d. Bicyclic dienes with condensed nuclei sharing two or more carbon atoms in which the two double bonds are located in different rings. Thus two carbon atoms may be shared as in an indene such as 4, 7, 8, 9-tetrahydroindene or three carbon atoms may be shared as in 2-alkylnorborna-2,5-dienes, in which the alkyl group may contain up to six carbon atoms, e. Bicyclic dienes substituted by an alkenyl group in which one double bond is located in one ring and the other double bond links the alkenyl group to a carbon atom in the other ring, e.g. 5-alkenylnorbornenes-2 containing up to six carbon atoms in the alkenyl group such as 5-methylene-2-norbornene and 5-ethylidene-2-norbornene, f. Bicyclic dienes substituted by an alkenyl group in which one double bond is located in one ring and the other double bond is located internally in the alkenyl group, e.g. 5-alkenylnorbornenes-2 in which the alkenyl group contains up to six carbon atoms such as 5-(1-propenyl)norbornene-2, g. Bicyclic dienes substituted by an alkenyl group in which one double bond is located in one ring and the other double bond is in a terminal position in the alkenyl chain, e.g. 5-alkenylnorbornenes-2 in which the alkenyl group contains up to six carbon atoms such as 5-isopropenylnorbornene-2.

h. Polycyclic dienes containing three or more rings in which the double bonds are located in different rings, e.g. dicyclopentadiene or a cyclohexenonorbornene, preferably in which the cyclohexene ring contains lower alkyl substituents on one or both of the doubly bonded carbon atoms such as 1,4-endomethylene-6-methyl-1,4,5,8,9,10-hexahydronaphthalene.

If desired two or more non-conjugated dienes may be used together in the process of the present invention.

The polymerisation zone provides for the monomers and catalyst to be in contact, preferably for a period of 0.1 to 10, more preferably 0.5 to 3 hours, at a temperature preferably of −30° to +80°C, more preferably +10° to +80°C, and a pressure preferably of 4 to 60, more preferably 7 to 30 ats. The zone may suitably be in the form of a loop reactor or a stirred pressure vessel which is preferably provided with means for maintaining the required temperature, e.g., a heating jacket and/or a cooling water or refrigeration system.

Under steady running conditions the ratio of propylene to ethylene concentrations in the polymerisation zone is preferably in the range 5 : 1 to 20 : 1 while the concentration of optional diene is preferably arranged so as to give a copolymer product containing 1 – 12% w/w diene. The catalyst concentration is preferably in the range of 0.1 to 1.0 millimoles transition metal complex per litre of liquid alphaolefine polymerisation medium. The amount of matrix material present will depend on the loading of transition metal complex on the matrix which may suitably be up to 0.5 millimoles/gram, preferably 0.01 to 0.05 millimoles/gram.

At the end of the reaction period a slurry of polymer particles, which also contain the catalyst, in liquid propylene which may contain some ethylene, hydrogen and optional non-conjugated diene leaves the reaction zone. It is advantageous at this stage that the polymer particles be separated from the unreacted monomers, in particular propylene, as rapidly as possible so as to minimise the formation of propylene homopolymers. It is also advantageous to maintain the polymerisation product under pressure to facilitate the reliquifaction of the recovered monomers for subsequent recycle.

The separation may be achieved by means of a centrifuge operating at a pressure of 2 to 30 ats., operation of the centrifuge incorporating a liquid propylene wash cycle with the separated polymer particles being subsequently freed from residual propylene by a suitable means, e.g., a fluidised bed drier using nitrogen carrier gas. Alternatively the polymer particles may be separated from unchanged monomer by means of a thin-film contact drier (as made by Luwa Limited) again operating under pressure. This type of drier comprises a cylindrical vessel preferably provided with a heating jacket in which the polymer slurry in liquid propylene is caused by means of a rotor to pass down the cylinder as a film against the internal wall (the residence time in the drier being about 0.1 to 5 minutes). The liquid propylene, ethylene and optional diene evaporate off in the drier at a temperature preferably 60° to 100°C, and are removed, but the pressure is preferably maintained at 15 ats. or more so that the propylene may be subsequently recondensed by means of cooling water alone, avoiding the need for an expensive compression stage or the use of refrigeration. Preferably two such driers are used, the first operating at 60° to 100°C and elevated pressure, i.e., 15 ats. or more removing the bulk of the propylene etc., and the second operating at similar temperature, i.e., 60° to 100°C, but reduced pressure, e.g., 20 to 50 mm. providing a final drying stage. In one convenient arrangement the first drier is arranged vertically, in which case the polymer slurry is introduced tangentially at the top and the second dried is arranged horizontally, the polymer being fed through it by a screw feeder.

A centrifuge or thin-film contact drier are only two means by which the polymer particles may be separated. Other methods may also be used, e.g., a spray drier in which the polymer slurry is sprayed into a region of reduced pressure; or a pressure filter in which the polymer is filtered through a filter in which pressure fluctuations are used to facilitate passage of monomers and release of polymer from the filter. Whichever method of separation is used it is desirable that a sufficiently elevated pressure be maintained (15 to 30 ats.) so that the evaporated propylene may be recondensed merely by cooling without compression or refrigeration. The thin-film contact drier is generally the preferred means of separation because it gives rapid product separation without the need for the further purification which is inherent in the other methods.

The polymer is recovered from the separation stage in granular or crumb form and is suitable for processing. Preferably the polymer contains 35 to 65% wt. ethylene, 65 to 35% wt. propylene and optionally 3 to 12% wt. non-conjugated diene. The molecular weight of the polymer preferably lies in the range of 3,000 to 1,000,000, and the polymer may be vulcanised by standard techniques for this type of product, the process being facilitated by the incorporation of a non-conjugated diene which provides residual unsaturation in the unvulcanised polymer.

If the polymer slurry has been separated by means such as centrifuging or filtration in which the propylene and other monomers are separated in liquid form, then the propylene and ethylene may be distilled from any residual diene and, after reliquifaction, be recycled to the process. The residual diene which will contain higher alkane and alkene by-products of the process, i.e., $C_4$ and higher is preferably redistilled before recycle to the polymerisation zone. If the polymer slurry has been separated by an evaporative technique, e.g., by a thin-film contact drier than the ethylene and propylene may be evaporated in a first stage of the drier and any optional diene, which is less volatile, evaporated in a second stage of the drier. The propylene may usually be liquified by cooling while the ethylene generally requires to be both compressed and cooled. Again the diene is preferably redistilled before recycle to free it from higher alkane and alkene by-products. In any method of polymer separation the hydrogen generally remains dissolved in the propylene, while both recovered ethylene and propylene may contain ethane and propane as polymerisation by-products. These latter may be maintained at a level tolerable for recycle either by venting the liquid ethylene and liquid propylene and thereby allowing the by-products together with some of the monomers to evaporate or by separate distillations of the liquid ethylene and propylene.

By means of the process of the invention a polymer product is obtained which does not require the conventional "de-ashing" process. In addition the catalyst is effectively halide-free reducing the corrosiveness of the reaction medium and thereby enabling cheaper materials of construction to be used for the plant.

The invention will now be further described with reference to the FIGURE which is a block diagram of the process.

Ethylene and propylene are purified by alumina and molecular sieve driers and de-oxygenating material and are stored in liquid form in vessels 1 and 2 respectively. The ethylene is stored at −30°C at 30 ats. pressure, and the propylene at +30°C at 30 ats. pressure. A source of nitrogen 3 is provided for flushing out vessels and storage tanks prior to use while hydrogen is fed to the process through a purification train 4 similar to that used for the ethylene and propylene. The catalyst which is the reaction product of zirconium tetrabenzyl with alumina is stored under toluene and is filtered in filter 5 and then flushed from the filter, by liquid propane into the polymerisation zone 6. Ethylidene norbornene, a non-conjugated diene is fed to the polymerisation zone from a purification still 7.

The polymerisation zone 6 comprises a cylindrical pressure vessel with stirrer and water cooling jacket and coil. The pressure in the vessel is 30 ats., the temperature 60°C and the residence time of the monomers and catalyst 60 minutes. The ratio of ethylene to propylene is 15 : 1 with a catalyst concentration of 0.25 millimoles transition metal per litre propylene and a hydrogen concentration of 0.1 to 0.2% v/v.

The polymer leaves the polymerisation zone as a slurry in liquid propylene which also contains unchanged ethylene, ethylidene norbornene, hydrogen and inert by-products such as ethane, propane and higher alkanes and alkenes. This slurry is fed to a separator operating at 15 ats. which comprises a vertical thin-film contact dryer 8 followed by a horizontal drier 9 of the same type but operating at 50 mm. Hg pressure (both heated to 100°C). In the first drier the polymer has a residence time of about 1 minute and the monomer level in the polymer is reduced to less than 1% wt/wt. The second, horizontal drier completes the separation process removing the bulk of the ethylidene norbornene, the dried polymer being stored in vessel 10. The vapours leaving the first drier are cooled in a water condenser 11 when propylene condenses, the uncondensed ethylene then being liquified by the compressor 12 and cooler 16. Liquified propylene containing dissolved hydrogen is stored in vessel 15 and liquified ethylene in vessel 13, both vessels being vented to remove a part of the ethane and propane together with some ethylene and propylene respectively. The vapour from the second drier 9 contains unchanged ethylidene norbornene and this is combined with fresh ethylidene norbornene from storage vessel 14, and forms the feed to still 7 operating at 70°C boiler temperature and 50 mm. pressure, higher alkane and alkene inert products being removed from this still as overheads. The recovered liquid propylene and ethylene in vessels 15 and 13 respectively are recycled to the polymerisation zone 6.

The invention will now be further described with reference to the following Examples.

EXAMPLE 1

Production of an Ethylene/Propylene Copolymer

The apparatus consisted of a 4-litre mild steel autoclave provided with a gas turbine stirrer, baffles, a level indicator, monomer and catalyst inlet and product withdrawal lines. The product withdrawal line was connected to a pressure let-down vessel.

The catalyst consisted of the reaction product of Grade B alumina and zirconium tetrakis (trimethylsilylmethylene) and was fed to the reactor as a slurry in liquid propane. The propylene feed rate was 2,700 ml. of liquid per hour, the ethylene feed rate 45 to 80 grams/hour and the catalyst feed rate 0.05 to 0.1 millimole of transition metal in 700 mls./hour of liquid propane. The reactor temperature was 50°C and the pressure 350 to 380 p.s.i. Hydrogen was also admitted to the reactor at a rate of 4 litres/hour.

The copolymer product was continuously removed from the reactor in liquid propylene. This slurry was transferred to the let-down vessel where the ethylene, propylene and hydrogen were evaporated for recycle (preceded by propylene liquifaction).

The make of polymer was 35 to 60 grams/hour of composition 35 wt.% propylene and 65 wt.% ethylene.

EXAMPLE 2

Copolymerisation of Ethylene, Propylene and Ethylidene Norbornene

The apparatus was the same as that described in Example 1.

The propylene feed rate was 250 to 400 mls. liquid/hour, the ethylene feed rate 27 to 33 grams/hour, the 5-ethylidene-2-norbornene feed rate 60 mls. liquid/hour, and the catalyst feed rate 0.1 to 0.2 millimoles transition metal/hour in 900 mls./hour of liquid propane. The catalyst was the same as in Example 1 and hydrogen was present to give a 20 p.s.i. partial pressure in the propylene.

15 to 20 Grams/hour of polymer were produced of composition 25% by weight propylene, 71% by weight ethylene and 4% by weight ethylidene norbornene.

We claim:

1. A process for the production of copolymers of ethylene and an alpha-olefine containing from three to 10 carbon atoms, which comprises:
   a. continuously introducing to a polymerisation zone ethylene and a liquid alpha-olefin containing from three to 10 carbon atoms in which the catalyst is the product of reacting a transition metal complex of formula $R_mMX_p$ with a substantially inert matrix material having a hydroxylic surface which is free from adsorbed water, wherein M is a transition metal of Groups IVA to VIA of the Periodic Table, R is a hydrocarbon group or substituted hydrocarbon group, X is a monovalent ligand such as a halogen and $m$ and $p$ are integers, $m$ having a value of from 2 to the highest valency of the metal M and $p$ having a value of from 0, to 2 less than the valency of the metal M,
   b. continuously reacting the ethylene and alpha-olefine in the liquid alpha-olefine so as to produce a slurry of copolymer particles suspended in the alpha-olefine,
   c. continuously removing from said zone said slurry of copolymer particles suspended in liquid alpha-olefine containing any unreacted ethylene, and
   d. continuously separating the copolymer particles under such a pressure that the alpha-olefine is reliquifiable by cooling without compression and recycling alpha-olefine to said polymerisation zone.

2. The process of claim 1 in which hydrogen is also introduced into the polymerisation zone.

3. The process of claim 1 in which R is alkyl, alkenyl or a substituted alkyl group of formula $—CH_2Y$ wherein Y is an atom or group capable of interraction with the vacant d-orbitals of the metal M.

4. The process of claim 1 in which the inert matrix material is alumina, silica or mixtures thereof.

5. The process of claim 1 in which monomers and catalyst are in contact in the polymerization zone for a period of 0.1 to 10 hours.

6. The process of claim 1 in which the temperature in the polymerisation zone is −30° to +80°C.

7. The process of claim 1 in which the pressure in the polymerisation zone is 4 to 60 atmospheres.

8. The process of claim 1 in which said alpha-olefine is propylene and the ratio of propylene to ethylene concentrations in the polymerisation zone is in the range 5 : 1 to 20 : 1.

9. The process of claim 1 in which the catalyst concentration in the polymerisation zone is in the range 0.1 to 1.0 millimoles transition metal complex per litre of liquid alpha-olefine polymerisation medium.

10. The process of claim 1 in which ethylene is copolymerised with propylene by:
    a. continuously introducing to the polymerisation zone:
       i. a slurry in a liquid hydrocarbon of the reaction product of a transition metal complex $R_mMX_p$ with alumina, silica or mixtures thereof, in which R is selected from the group consisting of $\pi$-allyl, $\pi$-methyallyl, neopentyl and $—CH_2Y$, where Y is phenyl, tolyl, xylyl, naphthyl, cyclo-octenyl or trimethylsilyl, M is titanium, vanadium or zirconium, X is halogen and $m$ and $p$ are integers, m having a value of from 2 to the highest valency of the metal M and $p$ having a value of from 0, to 2 less than the valency of the metal M,
       ii. ethylene,
       iii. liquid propylene,
       iv. hydrogen, and
    b. continuously reacting the ethylene and propylene in the liquid propylene for a period of 0.1 to 10 hours at a temperature of −30° to +80°C and a pressure of 4 to 60 atmospheres, the ratio of propylene to ethylene in the polymerisation zone being in the range 5 : 1 to 20 : 1 and the catalyst concentration in the range of 0.1 to 1.0 millimoles of transition metal complex per litre of liquid propylene,
    c. continuously removing from said zone the slurry of copolymer particles suspended in liquid propylene, and
    d. continuously separating the copolymer particles and recycling ethylene, propylene and hydrogen to the polymerisation zone.

11. The process of claim 10 in which a termonomer selected from the group consisting of 1,4-hexadiene, 5-methylene-2-norbornene, 5-ethylidene-2-norbornene, 5-(1-propenyl)-norbornene-2, 5-isopropenylnorbornene-2, 1,4-endomethylene-6-methyl-1,4,5,8,8,10-hexahydronaphthalene and dicyclopentadiene is copolymerised with the ethylene and propylene.

12. The process of claim 1 wherein a termonomer is copolymerized with the ethylene and alpha-olefine, said termonomer being a non-conjugated diene selected from the group consisting of 1,4-hexadiene, 1,6-octadiene, $C_6 - C_{12}$ monocyclic dienes, alkenyl cycloalkenes containing up to 12 carbon atoms, 4, 7, 8, 9-tetrahydroindene, 2-alkyl-norborna-2,5-dienes in which the alkyl group contains up to six carbon atoms, 5-alkenylnorbornenes-2 containing up to six carbon atoms in the alkenyl group, dicyclopentadiene and cyclohexenonorbornene.

* * * * *